United States Patent
Schmitz

(10) Patent No.: US 7,557,983 B2
(45) Date of Patent: *Jul. 7, 2009

(54) PRINTER WIPER FOR PRINTING ON BICHROMAL OR MULTI-COLORED ELECTRONIC PAPER

(75) Inventor: Gregory P. Schmitz, Los Gatos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/062,132

(22) Filed: Apr. 3, 2008

(65) Prior Publication Data

US 2008/0180785 A1    Jul. 31, 2008

Related U.S. Application Data

(63) Continuation of application No. 10/739,613, filed on Dec. 18, 2003, now Pat. No. 7,355,783.

(51) Int. Cl.
G02B 26/00 (2006.01)
(52) U.S. Cl. ....................................... 359/296
(58) Field of Classification Search ................. 359/296; 345/105, 107, 84, 85, 86; 430/32, 34, 35
See application file for complete search history.

(56) References Cited

U.S. PATENT DOCUMENTS

| | | | |
|---|---|---|---|
| 4,126,854 A | 11/1978 | Sheridon | |
| 5,389,945 A | 2/1995 | Sheridon et al. | |
| 5,717,515 A | 2/1998 | Sheridon | |
| 5,894,367 A | 4/1999 | Sheridon | |
| 6,055,091 A | 4/2000 | Sheridon et al. | |
| 6,222,513 B1 | 4/2001 | Howard et al. | |
| 6,262,707 B1 | 7/2001 | Sheridon | |
| 6,291,925 B1 | 9/2001 | Jacobson | |
| 6,456,272 B1 | 9/2002 | Howard et al. | |
| 7,265,894 B2 | 9/2007 | Schmitz | |
| 7,355,783 B2 * | 4/2008 | Schmitz | 359/296 |
| 2003/0071800 A1 | 4/2003 | Vincent et al. | |
| 2003/0137477 A1 | 7/2003 | Dances | |

OTHER PUBLICATIONS

European Search Report, Application No. EP 04 02 9257, Search completed Apr. 13, 2005.

* cited by examiner

*Primary Examiner*—Hung X Dang
*Assistant Examiner*—Tuyen Q Tra
(74) *Attorney, Agent, or Firm*—Fay Sharpe LLP

(57) ABSTRACT

An electronic display includes an electronic display material having two opposing outer surfaces, wherein at least one of the outer surfaces is at least partially covered in a plurality of spaced-apart charge-retaining islands comprised of a conductive material with areas of insulating material interposed therebetween. A charge transfer device is arranged in operative association with the display material, and includes a first component made of a pliable, nonconductive material and at least one conductive portion, and a second component configured to support the first component. Alternatively, a charge transfer device is configured to transfer an electric charge to charge-retaining islands of an electric display, where the charge-retaining islands are on a surface of the electric display and are spaced apart with areas of insulating material interspersed therebetween. The charge transfer device includes a first component made of a pliable nonconductive material and at least one conductive portion, and a second component made of a material to support the first component.

19 Claims, 8 Drawing Sheets

PRINTER WIPER FOR PRINTING ON BICHROMAL OR MULTI-COLORED ELECTRONIC PAPER

This is a continuation of application of U.S. Ser. No. 10/739,613, filed Dec. 18, 2003, entitled "Printer Wiper For Printing On Bichromal Or Multi-Colored Electronic Paper", by Gregory P. Schmitz, the disclosure of which is hereby incorporated by reference in its entirety.

BACKGROUND

This application relates to the use of electronic display systems, and more particularly to components used in the generation of images on the displays. In one embodiment the display systems are designed to include gyricon electric reusable paper but may also be electric reusable paper based on liquid crystal, electrophoretic, and other field-effect display technologies.

Electric reusable paper can be defined as any electronically-addressable display medium that approximates paper in form and function. Electric reusable paper should be lightweight, thin, and flexible, and it should display images indefinitely while consuming little or no power. In addition, electric reusable paper should be re-usable. One must be able to erase images and create new ones repeatedly. Preferably, electric reusable paper should display images using reflected light and allow a very wide-viewing angle.

One way to make electric reusable paper possible using traditional electronic display technology is to completely remove the driving electronics from an electronic display package and use external addressing electrodes to write and erase images. This approach both reduces the per unit cost of electronic paper sheets and enables the use of cheap, flexible plastic films in place of glass plates for packaging. Multiple electronic paper sheets can then be addressed by a single set of external driving electronics, much like multiple sheets of pulp paper are printed on by a single printer.

A sheet and display system dubbed gyricon is disclosed in various patents and articles, such as U.S. Pat. No. 4,126,854 by Sheridon, titled "Twisting Ball Display", incorporated herein in its entirety. The gyricon display system is comprised of a host layer a few mils thick which is heavily loaded with bichromal elements, possibly spheres, several microns in diameter. In one implementation, each bichromal element has halves of contrasting colors, such as a white half and a black half. Each bichromal element also possesses an electric dipole, orthogonal to the plane that divides the two colored halves. Each bichromal element is contained in a cavity filled with a dielectric liquid. Upon application of an electric field between electrodes located on opposite surfaces of the host layer, the bichromal elements will rotate depending on the polarity of the field, presenting one or the other colored half to an observer. It is noted that in addition to black and white electric displays, electric displays providing highlight color and additive full color have been disclosed. U.S. Pat. No. 6,456,272 by Howard et al., titled, "Field Addressed Displays Using Charge Discharging in Conjunction With Charge Retaining Island Structures", and U.S. Pat. No. 5,717,515 by Sheridon issued Feb. 10, 1998 and titled "Canted Electric Fields For Addressing A Twisting Ball Display" (each incorporated by reference in their entirety herein) describe several methods for making highlight color and full color versions of a electric reusable paper substrate and display.

An electric reusable paper substrate has many of the requisite characteristics of electric reusable paper, namely, bistable image retention, wide viewing angle, thin and flexible packaging, and high reflectance and resolution. U.S. Pat. No. 5,389,945 issued to Sheridon on Feb. 14, 1995, and titled "Writing System Including Paper-Like Digitally Addressed Media And Addressing Device Therefor", incorporated in its entirety herein by reference, describes an electric reusable paper printing system that employs independent, external addressing means to put images on the Electric reusable paper substrates. The external addressing means is described as a one-dimensional array of electrodes connected, either directly or by wireless technology, to modulating electronics. As the one-dimensional array is scanned across the sheet, modulating electronics adjust the potential at the individual electrodes, creating electric fields between the electrodes and an equipotential surface. An image is created in the sheet according to the polarity of the electric fields.

A common implementation of electric displays will use charge-retaining island patterning on the electric reusable paper sheets. This technique has been described in U.S. Pat. No. 6,222,513 by Howard et al., titled "Charge Retention Islands For Electric Paper And Applications Thereof", incorporated in its entirety herein by reference.

Charge-retaining island patterning is an electric reusable paper sheet that uses a pattern of conductive charge-retaining islands on the outward-facing side of at least one of two opposed outward surfaces. The second outward surface may also be coated with a conductive material, or made of a conductive material, and may or may not be patterned. The charge-retaining islands of the patterned surface or surfaces receive electric charges from an external charge-transfer device. After the charge-transfer device is removed, the conductive, charge-retaining islands hold electric charge, creating an electric field in the electric reusable paper of sufficient magnitude and duration to cause an image change.

An alternate embodiment of the charge-retaining island approach utilizes charge-retaining islands which are created as part of the bulk of the encapsulating layer instead of being patterned on the surface of the layer. Extending the conductivity of the charge-retaining islands through the bulk of the encapsulating layer to the sheet contained therein improves the performance of the charge-retaining islands and reduces problems of image instability when handled immediately after addressing.

A suitable mechanism for transferring charge to charge-retaining islands is by contact charging, whereby, a mechanical contact is made between conductive contact elements of an external charge transfer device and the conductive charge-retaining islands. When in contact, charge is transferred across the interface bringing the charge-retaining islands to the same electric potential as the contact elements. Charge remains on the charge-retaining islands, maintaining a voltage and an electric field in the sheet, well after contact is broken and the contact elements are removed from the writing area.

Mechanical contact may be made by use of a charge transfer device configured with alternating conductive charge transfer elements/conductors and insulating material. For proper operation, the charge transfer conductors need to make reliable contact to the charge-retaining islands while moving with respect to the electric paper sheet during image generation. Arrays using springy wire electrodes soldered to the edge of a printed circuit board have been demonstrated. More robust arrays utilizing anisotropically conductive elastomer connectors, such as Zebra connectors (e.g., conductive strip), as known in the art, have also been used.

A practical concern of proposed systems for printing on electric paper is the inability to insure reliable contact between the charge transfer device and the charge-retaining islands. The conductive strip and flexible printed circuit board strip commonly used to charge a charge-retaining island on electric paper, exhibit no appreciable memory (i.e., rigidity) along their length or width, making contact with the charge-retaining islands inconsistent, and thereby limiting print quality.

This inconsistent contact is exacerbated due to the non-planar surfaces of the electric paper. Particularly, existing manufacturing processes for forming the surface of electric paper cause imperfections and oscillations in its surface and, therefore, an undulating profile for the surface carries the charge-retention islands. Additionally, the surface may further have to deal with dirt and/or debris located in the insulating channels between the charge-retention islands. Due to the supple nature of the charge transfer device, when the charge transfer device operate in such environments, direct contact between the conductive strip and the electric paper surface is not fully maintained. Therefore, charging of the charge-retaining islands is inconsistent, resulting in streaks and fringes on the printed image.

SUMMARY

An electronic display includes an electronic display material having two opposing outer surfaces, wherein at least one of the outer surfaces is at least partially covered in a plurality of spaced-apart charge-retaining islands comprised of a conductive material with areas of insulating material interposed therebetween. A charge transfer device is arranged in operative association with the display material, and includes a first component made of a pliable, nonconductive material and at least one conductive portion, and a second component configured to support the first component.

Alternatively, a charge transfer device is configured to transfer an electric charge to charge-retaining islands of an electric display, where the charge-retaining islands are on a surface of the electric display and are spaced apart with areas of insulating material interspersed therebetween. The charge transfer device includes a first component made of a pliable nonconductive material and at least one conductive portion, and a second component made of a material to support the first component.

DETAILED DESCRIPTION OF THE PREFERRED EMBODIMENTS

Figure 1:
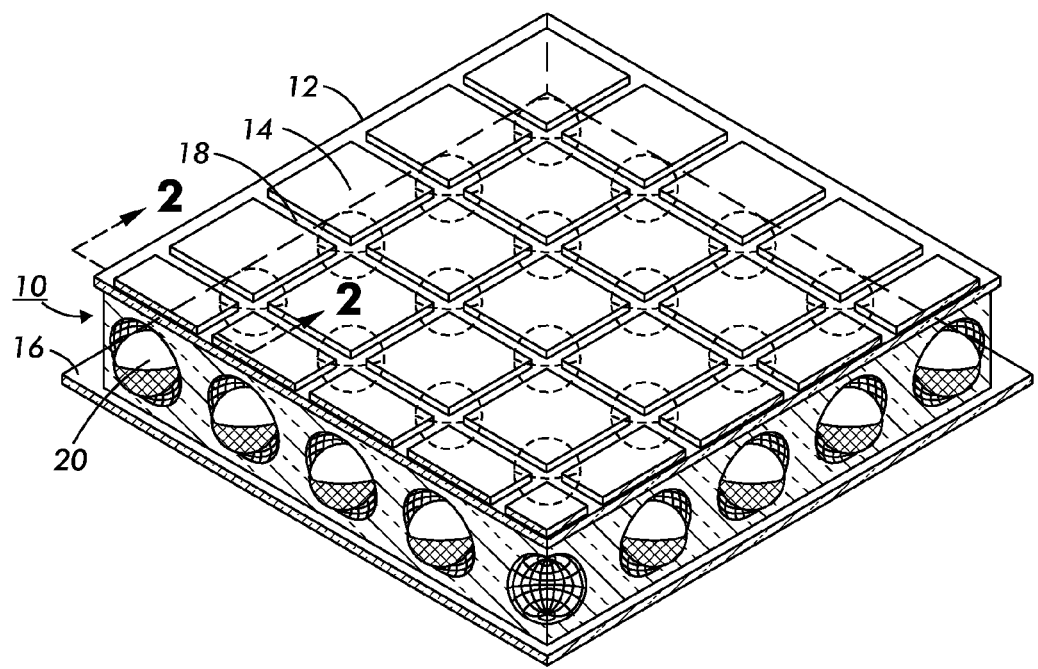
FIG. 1 shows a perspective view of an electric reusable paper sheet, according to the present application.

Turning now to FIG. 1 an electric reusable paper sheet, according to an embodiment described in the present application, is shown. The electric reusable paper sheet includes an electric reusable paper substrate such as a gyricon sheet 10 which contains bichromal elements 20, a first encapsulating layer 12 patterned with conductive charge-retaining islands 14, and a second encapsulating layer 16 that may or may not be patterned with charge-retaining islands. Although the bichromal elements 20 are pictured here as substantially spherical, it should be noted that other configurations are also possible. In particular, bichromal elements that are substantially cylindrically shaped are also known. A complete discussion of twisting cylinder electric reusable paper substrates, their use and manufacture can be found in U.S. Pat. No. 5,894,367 issued Apr. 13, 1999, titled "Twisting Cylinder Display Using Multiple Chromatic Values" by Sheridon, incorporated by reference herein in its entirety.

Together, the first encapsulating layer 12 and the second encapsulating layer 16 is configured to do the following things: contain an electric reusable paper substrate 10, provide at least one transparent window through which the electric reusable paper substrate 10 can be viewed, and provide at least one external surface patterned with charge-retaining islands 14 that can be addressed with an external charge transfer device. The first encapsulating layer 12 and second encapsulating layer 16 could take the form of thin plastic sheets that are sealed or fastened around the perimeter of the electric reusable paper substrate 10. The second encapsulating layer 16 need not be entirely separate from the first encapsulating layer 12. The second encapsulating layer 16 could simply be an extension of the first encapsulating layer 12, folded over and around the edge of the sheet and then sealed or fastened around the remaining perimeter. The first encapsulating layer 12 and second encapsulating layer 16 could also take the form of a coating, applied by spraying, doctoring, or some other method to hold the contents of the electric reusable paper substrate 10.

Charge-retaining islands 14 have square perimeters and are organized in a simple two-dimensional x-y matrix. Narrow channels 18 of encapsulating material layer 12 separate the charge-retaining islands 14. The channels 18 serve to isolate the charge-retaining islands 14, preventing migration of charge laterally across the encapsulating sheet, and should be small with respect to the charge-retaining islands 14, so that the maximum possible area of the display is covered with conductive charge-retaining material. The channels 18 must not become so small, though, that they fail to prevent significant charge leakage across the charge-retaining islands 14. Even if island-channel proportions are properly designed, in practice, dirt and accumulated debris can provide conduction paths across channels. Therefore, it is important to keep the surface of the patterned encapsulating layers clean.

It should be noted that the charge-retention islands need not be implemented in a regular two-dimensional pattern utilizing an x-y matrix. Other patterns are possible including a charge-retaining island pattern that utilizes a random array. When using other patterns, it is important that the charge-retaining islands 14 be relatively large compared to the channels 18. In a random distribution, both feature sizes must be much smaller than the pixel size of a displayed image. Pixel size is determined by the size or range of addressing elements of an external charge transfer device independently of the size of the charge-retaining islands 14. The charging array need not be registered or aligned perfectly with the pattern, though, because large groups of islands are charged by each addressing element and moiré effects are negated by the randomness of the island pattern.

The electric reusable paper substrate 10 can be constructed by techniques already known in the art. The charge-retaining islands 14 can be created on or in the encapsulating layer 12 by many means with any suitably conductive material. One technique creates islands of conductive and transparent Indium Tin Oxide (ITO) on a z-axis only conductive film. Z-axis conductive films are known and generally consist of a matrix loaded with conductive particles, such as silver coated glass beads, to allow for an electrically conductive interconnection through the films thickness. However, the conductive particles are spaced far enough apart to be electrically insulative in the plane of the film. The z-axis only conductive film is coated with a very thin layer of ITO, and then channels are etched in the ITO by photolithographic processes well known in the art. The remaining conductive ITO regions act as charge-retaining islands, while the channels 18 are created by the underlying z-axis only conductive film. Any conductive material such as chrome, aluminum, polyaniline which can be applied to form discontinuous conductive regions could be used in place of the ITO. Many z-axis only conductive materials, such as those made by 3M Corporation of St. Paul, Minn., Fuji Poly of Kenilworth, N.J., or Shin-Etsu Polymer Company, Limited of Japan, are possible candidates for a substrate on which to build the islands.

Figure 2:
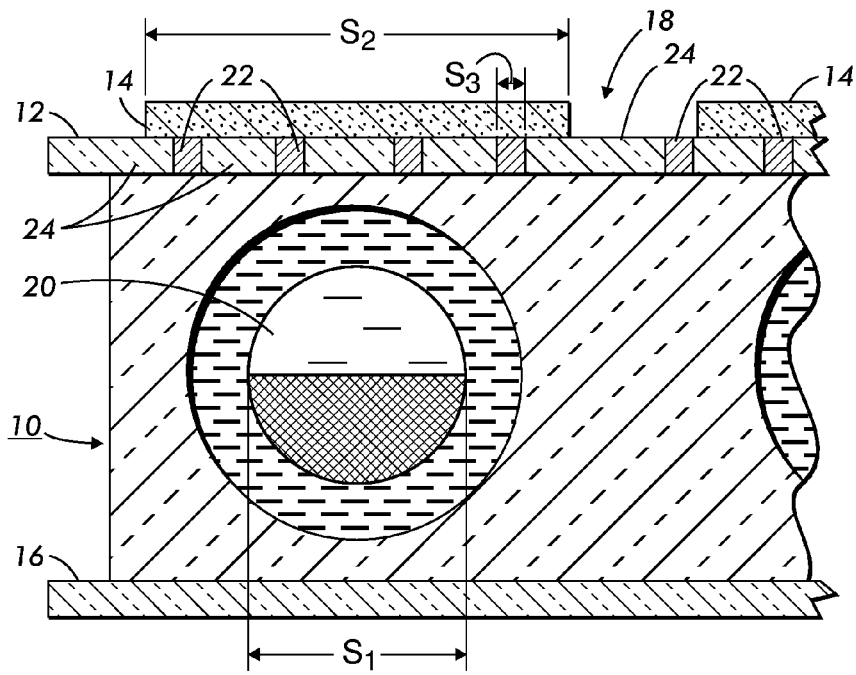
FIG. 2 shows an enlarged cross-sectional view of an electric reusable paper sheet according to the present application.

FIG. 2 shows an enlarged cross-sectional view of the electric reusable paper sheet shown in FIG. 1 taken through cross-section line 2-2. As can be seen in FIG. 2, the encapsulating layer 12 is clearly comprised of alternating conductive regions 22 and non-conductive regions 24. The rotational element 20, the charge-retaining island 14, and the conductive regions 22 each have a size s1, s2, and s3 respectively. The size s2 of the charge-retaining island 14 is shown to be on the order of the same magnitude of the size s1 of the rotational element 20. To achieve element rotation the size s2 of the charge-retaining island 14 should be no smaller than ½ the size s1 of the rotational element 20. The size of the conductive region s3 however, is substantially smaller than the size s2 of the charge-retaining island 14. The size of the conductive regions 22 should be kept as small as possible, but no larger than ⅓ of the size of the charge-retaining island 14. The conductive regions 22 in the encapsulating layer need not be of uniform size or distribution throughout the encapsulating layer 12, however they should be small enough and distributed enough throughout the encapsulating layer 14 such that at least one conductive region 22 is associated with as many charge-retaining islands 14 as possible for optimal performance.

Also, the conductive regions 22 should be placed relative to the charge-retaining islands 14 so that they do not bridge the channel 18 between two charge-retaining islands 14. The size and distribution will vary with manufacturing techniques. For instance, if accurate placement of the conductive regions 22 can not be maintained then it may be desirable to make the conductive regions 22 much smaller than the size of the channel 18 to insure that a conductive region 22 can not bridge the channel 18 between two charge-retaining islands 14 as shown in FIG. 2.

The size s3 of any single conductive region 22 is too small to effectively rotate the rotational element. However, the charge-retaining island 14 in conjunction with the conductive regions 22 can together effectively be addressed and achieve rotation of the rotational element without suffering from the image instability problems associated with charge removal when an electric reusable paper sheet is handled immediately after addressing.

An external charge transfer device must also be chosen to work with a charge-retaining island pattern. Examples are described in U.S. Pat. No. 6,222,513 by Howard et al., titled "Charge Retention Islands For Electric Paper And Applications Thereof", and U.S. Pat. No. 6,456,272 by Howard et al., titled "Field Addressed Displays Using Charge Discharging In Conjunction With Charge Retaining Island Structures", both incorporated by reference herein above. As mentioned, a suitable mechanism identified for transferring charge to charge-retaining islands, is contact charging, whereby, a mechanical contact is made between conductive contact elements of an external addressing array and the conductive charge-retaining islands. When in contact, charge is transferred across the interface bringing the charge-retaining islands to the same electric potential as the contact elements. Charge remains on the charge-retaining islands, maintaining a voltage and an electric field in the sheet, well after contact is broken and the contact elements are removed from the writing area.

Various mechanical arrangements have been envisioned for external charge transfer devices that utilize the above charge transfer mechanisms. One of these is a one-dimensional array of charge transfer elements which could be built and used like a print head or wand. The contact charging wand is comprised of alternating conductive charge transfer elements and insulating elements.

The charge-retaining islands technique, described above, can also be used to implement a gyricon with grey scales, highlight color, additive full color, or custom colors using only simple bichromal elements.

Figure 3:
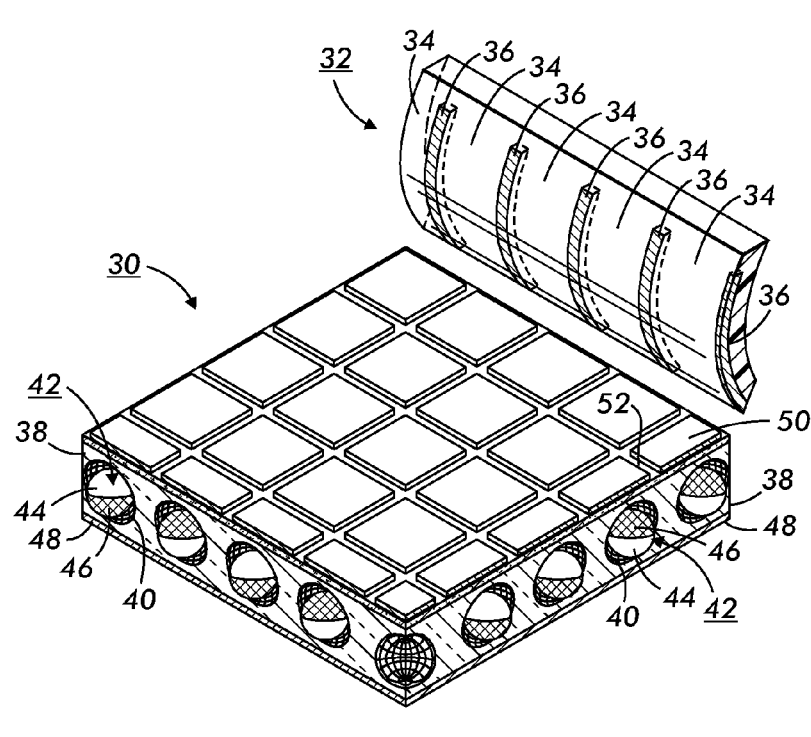
FIG. 3 is an electric reusable paper sheet illustrating a Zebra conductive wand implementation.

FIG. 3 shows a portion of a electric reusable paper sheet 30 with an arrayed charge transfer device 32 configured as a conductive strip or wand (i.e., Zebra conductor), which in one embodiment is made of an elastomer, plastic or other flexible, compliant non-conductive material 34, with conductive wires 36 embedded or otherwise connected to conductive material 34. The electric reusable paper sheet 30 comprises an electric reusable paper substrate, such as gyricon sheet 38 with fluid filled cavities 40, wherein each cavity contains a bichromal element such as bichromal element 42 which is divided into two different portions 44, 46, each portion having an optical characteristic. One surface of the electric reusable paper sheet 30 is covered with a conductive material 48 to provide an equipotential surface while the other surface of the electric reusable paper sheet 30 is covered with an array of charge-retaining islands 50 separated by channels 52. It should be noted that this particular configuration is used for illustrative purposes only and the foregoing described variations in charge transfer devices and construction of charge-retaining islands and equipotential surfaces are also applicable. Further, while FIG. 3 shows only one bichromal element associated with each charge-retaining island in practice it would be more likely that many bichromal elements would be associated with a given charge-retaining island. In such instances, the bichromal elements can be arranged in any pattern such as close packed array or a random distribution as is already known in the art. Furthermore, while the bichromal elements are shown as bichromal spheres in this drawing, they need not be spheres but might also be bichromal cylinders as described in U.S. Pat. No. 6,055,091, titled "Twisting Cylinder Display", by Sheridon et al., assigned to the same assignee and herein incorporated by reference in its entirety.

Figure 4:
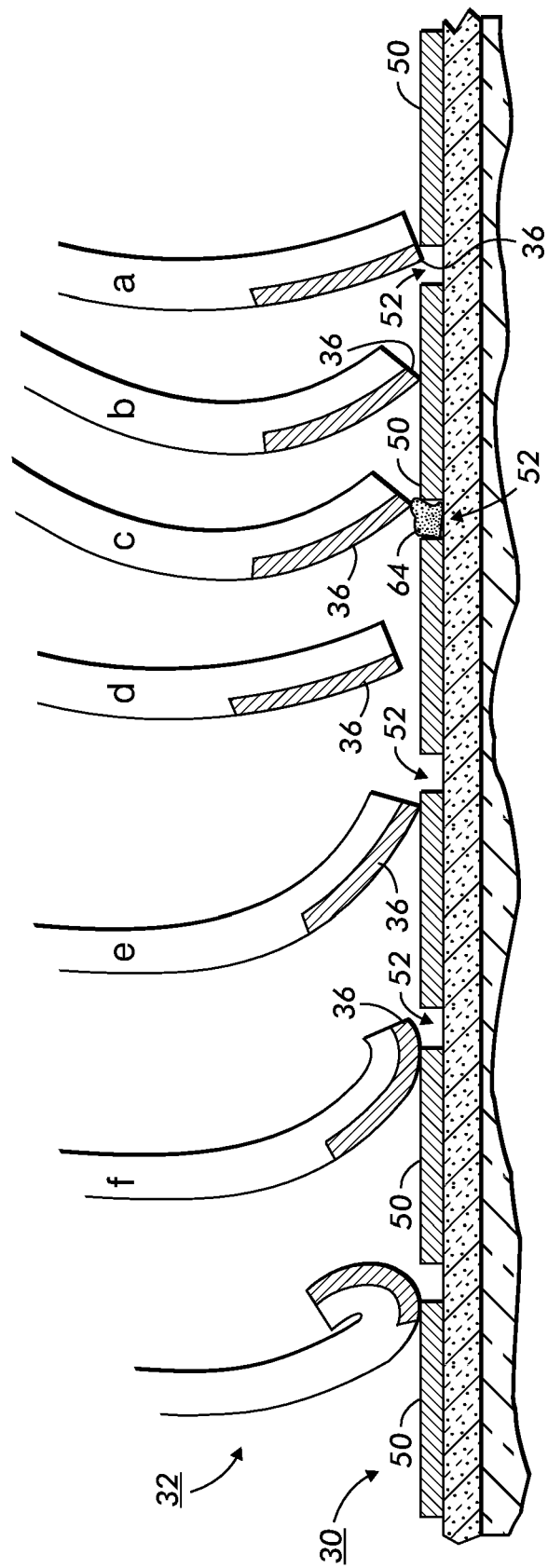
FIG. 4 depicts a non-planar surface which results in a non-reliable contact between the charge transfer device and the charge-retention islands.

Turning to FIG. 4, illustrated is a side view of electric usable paper sheet 30 with conductive strip (i.e., Zebra conductor) 32, shown at stages a-f as conductive strip 32 moves over the surface comprised of islands 50 and channels 52. One difference between this implementation and that of FIG. 3, is that in at least one of the channels 52, an impediment 64, such as a deformation of the surface occurring during manufacture, or dirt/debris on the surface causes the surface to be other than planar. As previously noted, and as illustrated in the movement of charge transfer device 32 through steps a-f, such impediment may cause incomplete contact between charge transfer device 32 and the surface of charge-retaining islands 50. More specifically, as shown at point a, movement of charge transfer device 32 starts below island surface 50, whereby the entire surface of charge-retaining island 50 will come into contact with conductive wires 36, a charge transfer device 32 is moved along, as shown at position b. However, at position c, the charge transfer device 32 impinges on impediment 64. A it passes the impediment and reaches position d, conductive wire 36 is not in contact with the surface of charge-retaining island 50. In some cases, there will be time for charge transfer device 32 to have contact with some portion of the island as shown at point e. However, in other instances, there will be no contact until movement is to the next charge-retaining island 50.

Also, while charge transfer device 32 is shown touching the surface of charge-retaining island 50 in step e, even if there is contact, the contact may be insufficient to permit a proper transfer of charge.

As also illustrated in FIG. 4, it is desirable to have a sharp edge of conductive strip 32 to come into contact with the charge-retaining islands 50. Another drawback of an overly flexible conductive strip is illustrated at position f. In this instance, when the downward pressure is over a certain value, the compression in the conductive strip will cause the sharp end to curl up in an undesirable fashion. Thus, with insufficient support, this curled-up position results in a less-than-desirable contact between the conductive strip and charge-retaining islands.

In one implementation, the charge transfer device 32, when formed as a conductive strip is in a range of approximately 0.01 and 0.04 inches thick, and is preferably 0.02 inches thick. It is supple and without any appreciable resistance to flexior along its length and width. The conductive strip can be visualized as a windshield wiper on an automobile being swiped across the gyricon media during printing. The conductive wires 36, as previously noted, may be embedded in a conductive strip perpendicular to its length in order to make contact at one end with the electric paper 30 and at another end to a controller such as a circuit board (not shown). A problem with this design is that the conductive strip has no appreciable "memory" (rigidity) along its length or width. Because of the supple nature of the conductive strip, direct contact between the conductive wires and the electric paper is not consistent along the paper surface, therefore, the charging of the charge-retention island 50 is inconsistent. The effects of this inconsistency results in streaks and fringing of the printed images.

In view of these shortcomings, it has been realized that there is a benefit in incorporating a mechanism to provide the conductive strip with an elastic character, i.e., resiliency, which will make the conductive strip compliant over uneven surfaces, while at the same time the its original intended shape of the conductive strip.

Figure 5:
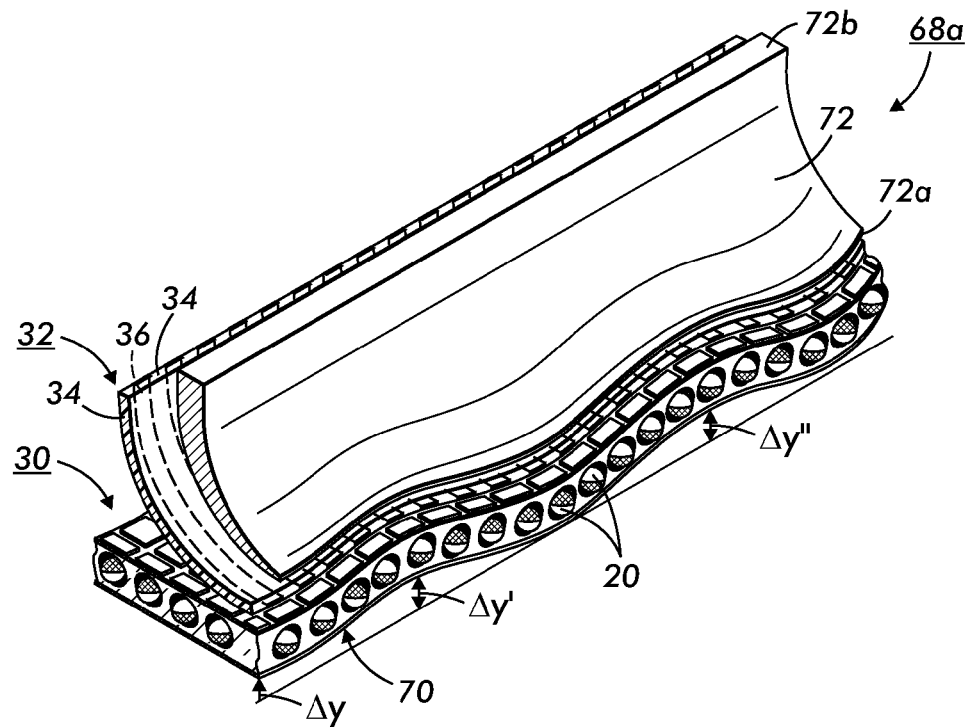
FIG. 5 shows an illustrated view of a first embodiment of a wand-type structure in accordance with the concepts of the present application.

Turning to FIG. 5, provided is an exploded partial view of a first embodiment for a arrayed charge transfer device 68a associated with the electric reusable paper sheet 30 of the present application. As illustrated, electric reusable paper sheet 30 may have an uneven surface 70 (designated by the $\Delta y$, $\Delta y'$ and $\Delta y''$ designations). Charge transfer device 68a of the first embodiment, is comprised of the conductive strip (Zebra connector) 32 with a flexible tapered arch spring support 72. In this embodiment, spring support 72 may be at least one of metal, polymer or composites thereof. As illustrated in FIG. 5, a first or proximal end 72a of spring support 72 is located nearest to the electric paper sheet 30, and second or distal end 72b is furthest from electric reusable paper sheet 30. Spring support 72 is formed in a flexible wedge design, wherein the thickness of the material increases nearer the distal end 72b. First or proximal end 72a is also considered the leading edge of the conductive strip 32.

Figure 6:
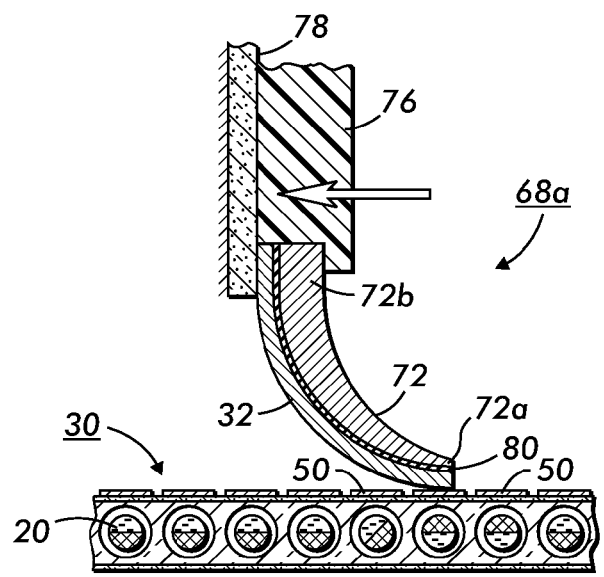
FIG. 6 is a side view of FIG. 5 with additional structure for holding the wand design.

Turning to FIG. 6, in operation conductive strip 32 and spring support 72 are held in place in a secure arrangement by clamp 76. As also illustrated in this figure, conductive strip 32 is in association with a circuit board 78, whereby power is selectively provided to individual conductive wires 36 of conductive strip 32. By this design, the conductive wires are selectively supplied with power to cause a selective activation/movement of bichrome balls 20 as charge is selectively applied to islands 50. The actual connections between conductive strip 32 and circuit board 78 are well known in the art and will not, therefore, be discussed in greater detail.

With continuing attention to FIGS. 5 and 6, it may be noted that addition of spring support 72 provides a progressive pressure onto the surface of the charge-retaining islands 50. As the bending of conductive strip 34 increases, stiffness caused by the increased material near the distal end 72b results in greater application of pressure onto the charge-retaining island 50, insuring a reliable contact between the conductive wires 36 of conductive strip 34 and surface of charge-retaining islands 50.

The progressive pressure addresses the situation where the surface is uneven or debris/dirt is on the surface of electric reusable paper sheet 30. Particularly, when an impediment, such as impediment 64 of FIG. 4, is encountered on the surface of the electric reusable paper sheet 30, progressive pressure will cause an increase pressure on the conductive strip 32 in a quicker, more resilient manner such that as the conductive strip moves past the impediment 64, more immediately and aggressively moves downward into contact with the next charge-retaining island 50. Use of spring support 72 also acts to restrict the first end or leading edge 72a of spring support 72 from curling upward when a downward pressure is applied. These benefits are also obtained by use of the following embodiments.

Dependant on the material of spring support 72, an optional pliable insulator 80 may be appropriate. If, for example, spring support 72 has conductive features, isolation between the spring support 72 and conductive strip 32 is desirable. Therefore, insulator 80 is incorporated to provide isolation between the two components. While insulator 80 may be pliable, its addition would need to be taken into account to determine the specific construction parameter spring support 72, in order to ensure appropriate pressure. Insulator 80 may have adhesive characteristics which act to hold the conductive strip 32 and spring support 72, and/or may also provide a cushion between the components. Still further, insulator 80 may be a single layer or multiple layers.

Figure 7:
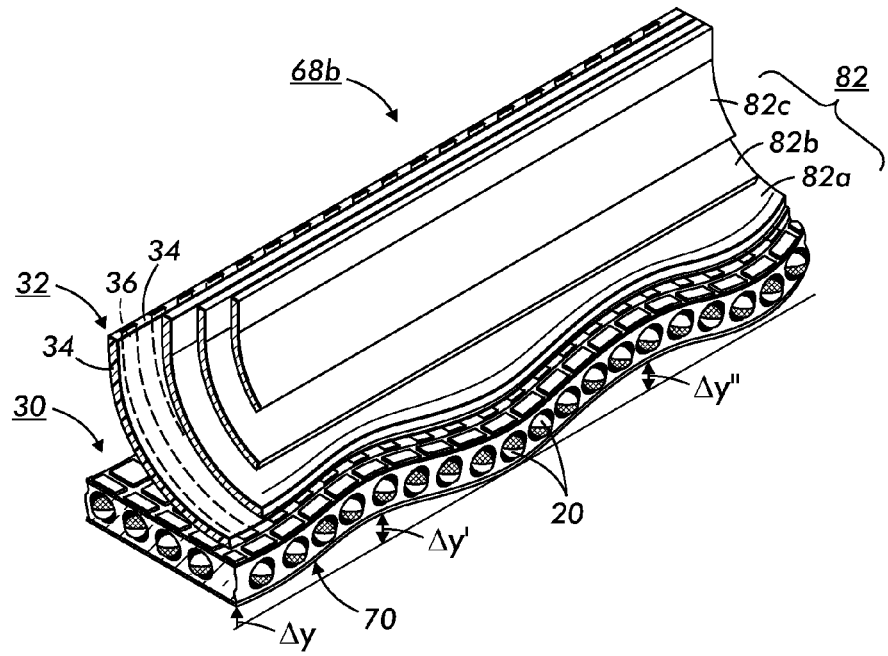
FIG. 7 illustrates a second embodiment for the present application.

Turning to FIG. 7, set forth is a partial exploded view of a charge transfer device 68b in accordance with a second embodiment. In this design, single flexible tapered arch spring support 72, is replaced with a flexible leaf spring arch support 82, which includes more than one, and preferably a plurality of progressively shorter flexibly arched strips 82a-82c. Flexible arch support strips 82a-82c are shown in this embodiment as having a substantially uniform thickness throughout their length. The strips are arranged for the longest strip 82a to be closest to the conductive strip 32.

Figure 8:
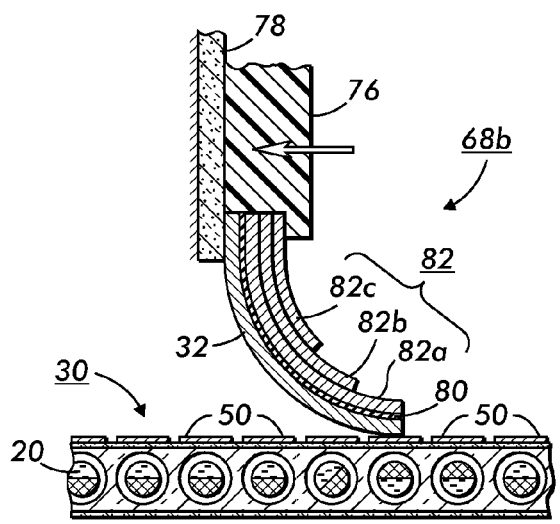
FIG. 8 is a side view of FIG. 7 with additional structure to hold the wand implementation of the present embodiment.

As shown more particularly in FIG. 8, and similar to the arrangement of FIG. 6, the flexible leaf spring arch support 82 is held with conductive strip 32 by a clamp 76 on one side, which by the arrangement shown places conductive strip 32 in association with circuit board 78. This design, again, similar to FIG. 6, permits signals to be selectively supplied to conductive wires 36 to provide a charge to charge-retention islands 50. As may be seen in the side view of FIG. 8, individual flexible leaf spring arch strips 82a-82c are arranged in a progressively shorter (from the conductive strip 32) arrangement, provides an alternative design to obtain progressive pressure on charge-retaining islands 50.

Similarly, as discussed in connection with FIGS. 5 and 6, the arrangement shown in the side view of FIG. 8 results in a progressive pressure which permits the conductive strip 32 to more aggressively move back into contact with charge-retaining island 50 after the conductive strip 32 has encountered an impediment.

Also similar to the previous embodiment, the optional pliable insulator 80 may be incorporated when the arch strips 82a-82c have conductive characteristics.

Figure 9:
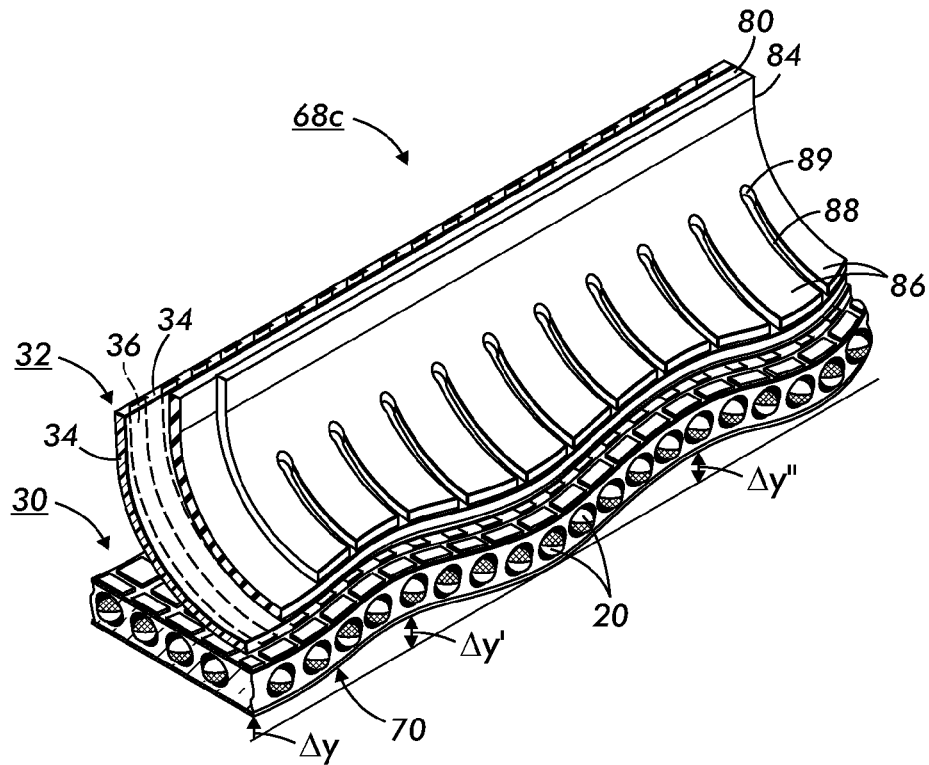
FIG. 9 is a third embodiment of a wand in accordance with the present application.

Turning attention to FIG. 9, shown is a partial exploded view of a charge transfer device 68c in accordance with a third embodiment. In this design, a flexible slitted arch strip 84 includes a plurality of fingers 86 created by slits 88. Insulator 80 is positioned between the flexible slitted arch strip 84 and conductive strip 32. Flexible slitted arch strip 84 is a back structure to the conductive strip 32, allowing the conductive strip to be compliant over the uneven surfaces and thereby provides reliable contact to the charge-retaining islands 50. Thus flexible slitted arch strip 84 is designed to provide the conductive strip 32 with the elastic character, i.e., resiliency it lacks. Flexible slitted arch strip 84, may be formed from metal, plastic or other composite. The fingers 86 formed by slits 88 having relief holes 89 add to the flexibility provided as charge transfer device 68c moves over the surface of electric paper sheet 30. For example, when the surface is uneven (or there is dirt/debris) in a particular area, fingers 86 directly over and close to that area will be lifted along with that portion of conductive strips 32, whereas the remaining fingers 86 not near the uneven area will maintain downward pressure, keeping conductive strip 32 in contact with the surface. This provides a refined adjustment for an individual area of the conductive strip. The side view of FIG. 10 again shows the flexible slit arch strip 84c, insulator 80 and conductor strip 32 clamped by clamp 76, such that a connection to circuit board 78 provides power selectively to the conductive wires 36 of conductive strip 32.

Figure 10:
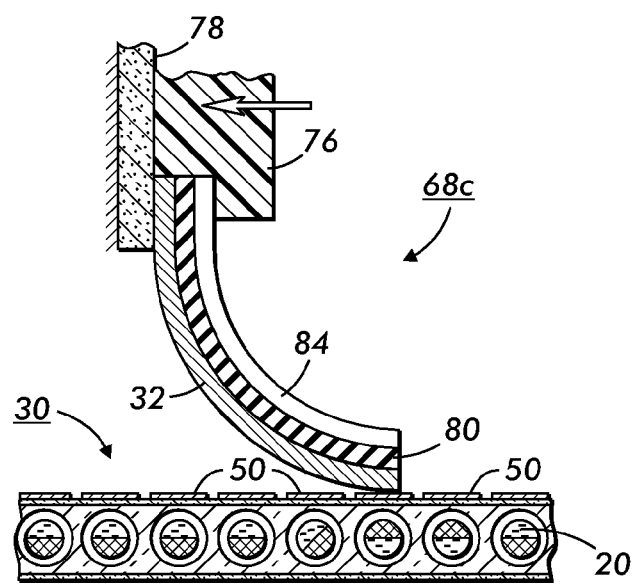
FIG. 10 is a side view of FIG. 9, including additional structure for holding the wand design.

It is to be appreciated that the first and second embodiments previously discussed may incorporate the slitted features shown in the embodiments of FIGS. 9 and 10. More specifically, the flexible arch spring support 72 may incorporate not only the wedge-type feature providing progressive pressure, but may also be formed with the slitted features of FIGS. 9 and 10. Such a design will then have the benefits of the progressive pressure and also the capability to provide a more refined movement over those areas specifically affected by a impediment. A similar design may also be implemented in the embodiment shown by FIGS. 7 and 8. In this design, the individual leaf strips 82a-82c are provided with the slit features of FIGS. 9 and 10.

Figure 11:
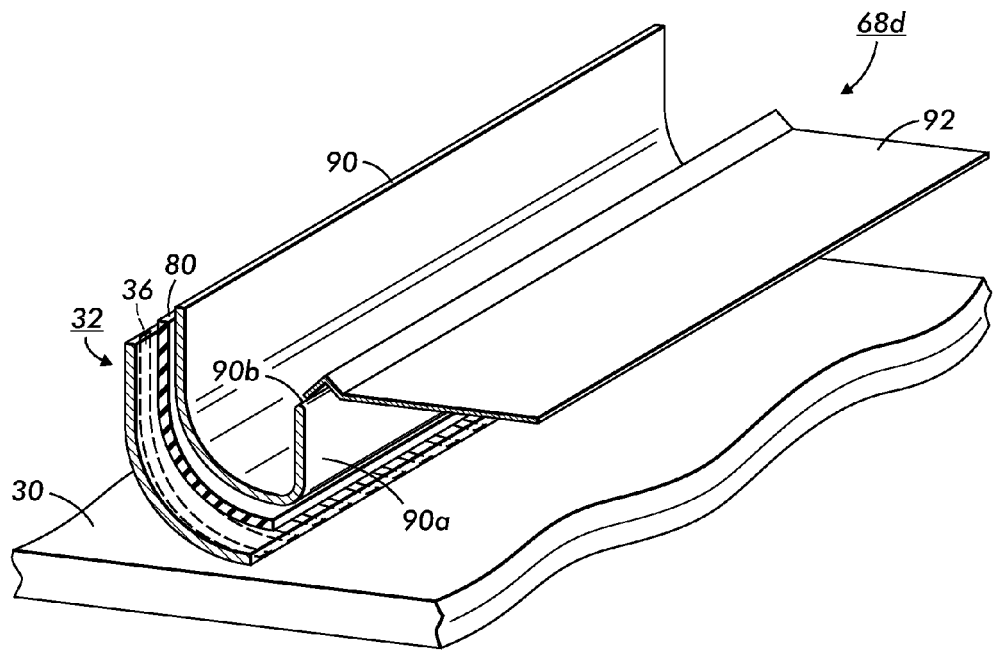
FIG. 11 depicts a further embodiment and a testing element for testing the pressure delivered by the wand design.
Figure 12:
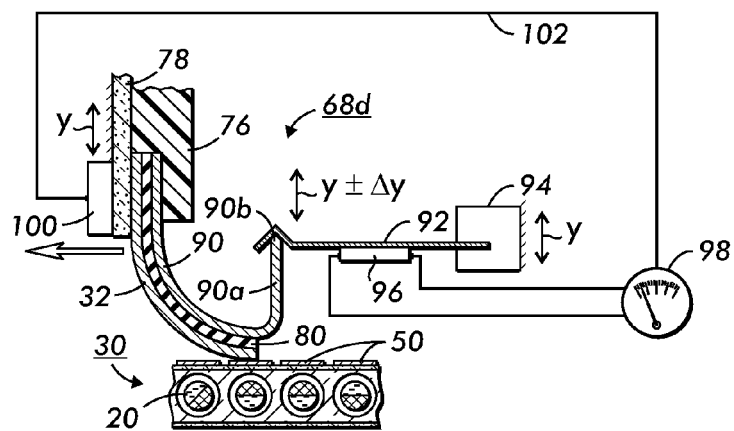
FIG. 12 is a side view of FIG. 11 with additional structure showing attachment of the wand design and a testing configuration for determining the pressure applied to the charge-retention islands.

Turning to FIGS. 11 and 12, depicted is a further embodiment of a charge transfer device 68d incorporating a flexible curved channel 90 which is used as a back structure to conductive strip 32. Curved channel 90 is designed to provide conductive strip 32 with elastic characteristics that it otherwise would lack. Insulator 80 is used between conductive strip 32 and curved channel 90. As in previous embodiments, insulator 80 may be formed as an adhesive and/or cushion. As part of channel 90, arm 90a is raised at an angle whereby its upper edge 90b, is positioned to receive a cantilever beam 92. As depicted more clearly in FIG. 12, cantilever beam 92 is held by clamp 94 and is designed to provide a downward force on edge 90a of curved channel 90, which in turn is applied to conductive strip 32 and electric paper sheet 30. A strain gauge arrangement 96, which may include a single strain gauge or a plurality of strain gauges, is connected to a bottom surface of cantilever beam 92. The output of strain gauge arrangement 96 is provided to a strain meter 98. Data from strain meter 98 is provided to a controller 100, on circuit board 78, via feedback line 102. Through this design, data can be processed to determine a desired contact pressure of the conductive strip 32. This contact pressure can then be used as the feedback to set a printhead contact pressure prior to each print cycle. Channel 90 and cantilever beam 92 may be made and formed from metal, plastic or other composite. For predictability purposes, the cantilever beam should be constructed from a predictable material, such as copper or steel, with the characteristics of a spring.

Figure 13:
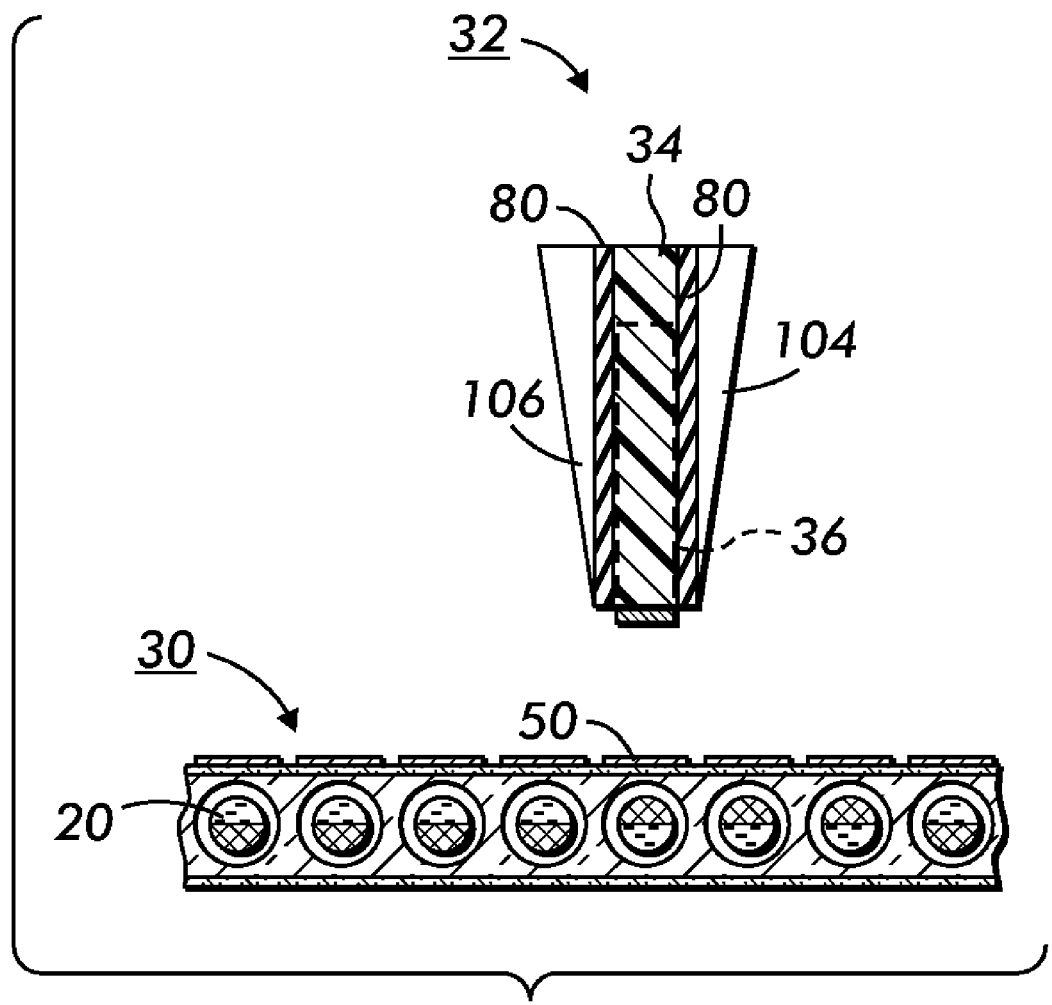
FIG. 13 illustrates that each of the embodiments described may be implemented in a bidirectional system where the additional support structure is located on both sides of the conductive strip.

Turning to FIG. 13, illustrated is a cross-sectional view of a further embodiment of the present application. In this design, conductive strip 32 is shown in cross-section at one of conductive wires 36, shown as dotted line 36. In this particular embodiment, the non-conductive material 34 is depicted at the top, indicating conductive wire 36 does not extend from the top to bottom of conductive strip 32. However, in other embodiments electric wire 36 may extend the length of the conductive strip 32. In either case, as in previous embodiments, a second component (i.e., support) 106 is placed in operational contact with a first surface of conductive strip 32. The first component 104, as in the previous embodiment, is a support element and is intended to represent each of the foregoing support element embodiments, including the spring support 72, multi-layered leaf spring support 82, the slitted support 84, conductive channel 90 and the further embodiments incorporating elements of these.

In addition to this first component 104, a second component 106 is also now provided. In this design, second component 106 may also be any of the aforementioned embodiments discussed in connection with component 104. Thus, conductive strip 32 has support elements on both side surfaces. This design permits for a bidirectional operation of the system across electric paper 30. Particularly, in one embodiment, in moving in a first direction, the charge-transfer device 108 will more in a first direction generating an image, and then when reaching an end of electric paper 30, may move in a second direction back toward the first location, erasing certain image elements. Alternatively, of course, the system may write in both directions or read in both directions. The system will be held by the clamp mechanism, and will be supplied with signals in accordance with the previously discussed processes.

It is to be appreciated that, while the foregoing description sets forth embodiments for charge transfer devices, the concepts of the present application may be equally extended to other embodiments upon an understanding of the present application. Particularly, it is understood others will recognize modifications and adaptations of the illustrated embodiments which are in accord with the principles of the present application. Therefore, the scope of the present application is to be defined by the appended claims.

The invention claimed is:

1. An electric display system comprising:
   an electric display material having two opposing outer surfaces; and
   a charge transfer device arranged in operative association with the display material, and having a first component made of a pliable non-conductive material and at least one conductive portion, and a second component configured to support the first component, wherein the second component provides an elastic character to the first component, making it compliant over uneven surfaces while maintaining its original intended shape, the second component configured to become progressively stiffer as deflection increases.

2. The display according to claim 1, wherein the second component is a flexible tapered spring arch support, which is thickest at a first end which is intended to be distant from the-charge-retaining islands.

3. The display according to claim 1, wherein the second component is a flexible leaf spring arch support including a plurality of progressively shorter arch strips positioned on top of each other, with the longest of the arch strips nearest the first component and the shortest of the arch strips farthest from the first component.

4. The display system according to claim 1, further including an insulating component located between the first component and the second component, the insulating component providing electrical isolation between the first and second components.

5. The display system according to claim 4, wherein the insulating component includes adhesive characteristics, wherein the first component and second component are held in place by the insulating component.

6. The display system according to claim 4, wherein the insulating component has a pliable characteristic which provides a cushion between the first component and the second component, increasing compliance of the charge transfer device.

7. The display system according to claim 1, further including a clamp arranged to hold ends of the first component and the second component distant from the electric display material.

8. The display system according to claim 1, wherein the second component is a flexible tapered spring arch support, which is thickest at a first end which is intended to be distant from the electric display material.

9. The display system according to claim 1, further including a third component, wherein the second component supports the first component on a first side, and the third component is positioned to support the first component on a second side.

10. The display system according to claim 9, wherein the first component, second component and third component are arranged for bi-directional operation of the charge transfer device.

11. An electric display system comprising:
    an electric display material having two opposing outer surfaces; and
    a charge transfer device arranged in operative association with the display material, and having a first component made of a flexible non-conductive material and a plurality of individually adjustable conductive elements, wherein movement of one adjustable conductive element does not result in movement of another adjustable conductive element.

12. The electric display according to claim 11, wherein the first component is a flexible block of material, and the individually adjustable elements are charge transfer fingers, having at least a portion located within the flexible block of material.

13. The electric display according to claim 12, wherein the charge transfer fingers include an end portion extending from the flexible block at a direction towards the electric display material.

14. The electric display according to claim 11, wherein the flexible non-conductive material includes a plurality of slits along a length of the material, defining individual flaps which are at one end free to move independently of each other, and at a second end are interconnected.

15. The electric display according to claim 14, wherein the adjustable conductive elements are flat pieces of metal extending in a length direction to form a plurality of adjustable flat fingers which are free to move at a first end.

16. The display system according to claim 11, wherein the charge transfer device is configured to operate bi-directionally.

17. The display according to claim 11, further including a second component, wherein the second component provides an elastic character to the first component making it compliant over uneven surfaces while maintaining its original intended shape, the second component configured to become progressively stiffer as deflection increases.

18. The display system according to claim 17, further including an insulating component located between the first component and the second component, the insulating component providing electrical isolation between the first and second components.

19. The display system according to claim 18, further including a third component, wherein the second component supports the first component on a first side, and the third component is positioned to support the first component on a second side.

* * * * *

UNITED STATES PATENT AND TRADEMARK OFFICE
CERTIFICATE OF CORRECTION

PATENT NO. : 7,557,983 B2  Page 1 of 1
APPLICATION NO. : 12/062132
DATED : July 7, 2009
INVENTOR(S) : Gregory P. Schmitz It is certified that error appears in the above-identified patent and that said Letters Patent is hereby corrected as shown below:

Title page, item (73) Assignee: should read as follows:
Xerox Corporation, Norwalk, CT (US)

Signed and Sealed this

Twenty-second Day of December, 2009

David J. Kappos
*Director of the United States Patent and Trademark Office*